United States Patent [19]
Green et al.

[11] 3,971,765
[45] July 27, 1976

[54] ANAEROBICALLY-CURING ADHESIVES

[75] Inventors: George Edward Green, Cherry Hinton; Bernard Peter Stark, Stapleford, both of England

[73] Assignee: Ciba-Geigy Corporation, Ardsley, N.Y.

[22] Filed: Dec. 9, 1974

[21] Appl. No.: 531,029

[30] Foreign Application Priority Data
Dec. 27, 1973 United Kingdom............... 59766/73

[52] U.S. Cl............................... 260/78 A; 156/310; 156/331; 260/471 R; 260/475 N; 526/317; 526/320; 526/328; 526/263; 526/265; 526/310; 526/271; 526/915
[51] Int. Cl.²................. C08G 69/44; C08G 73/16; C08F 18/14; C08F 120/02
[58] Field of Search ............... 260/78.4 E, 78.4 EP, 260/78.4 D, 78 A

[56] References Cited
UNITED STATES PATENTS

| | | |
|---|---|---|
| 3,221,043 | 11/1965 | Fekete et al. .................. 260/78.4 R |
| 3,317,465 | 5/1967 | Doyle et al. .................... 260/78.4 E |
| 3,567,694 | 3/1971 | Jefferson et al. ............... 260/78.4 E |
| 3,598,792 | 7/1975 | Jefferson et al. ............... 260/78.4 E |

*Primary Examiner*—Joseph L. Schofer
*Assistant Examiner*—Herbert J. Lilling
*Attorney, Agent, or Firm*—Vincent J. Cavalieri

[57] ABSTRACT

Contamination of anaerobically-curing adhesive compositions by minute traces of metals such as iron, either during manufacture or storage, can result in premature polymerization, the shelf life of the composition being severely shortened, or, at best, unpredictable.

In the anaerobic adhesive composition now disclosed, at least part of the polymerizable monomer comprises a novel acrylate ester containing a structure of the formula

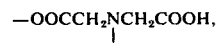

these esters being capable of chelating the metal contamination.

31 Claims, No Drawings

ANAEROBICALLY-CURING ADHESIVES

THIS INVENTION relates to anaerobically-curing adhesives.

Anaerobically-curing adhesive compositions are stable on storage in air or other oxygen-containing gas but, in the presence of an initiator of free-radical polymerisation, they polymerise when the oxygen is excluded. The reason usually advanced for this behavior is that free radicals continuously generated in the composition react with the oxygen while this is available: when, however, oxygen is excluded, the radicals induce polymerisation of the monomeric component of the adhesive. By sandwiching the composition between two substantially nonporous surfaces (such as a nut and bolt) and so excluding air, polymerisation is induced and the polymerised monomer forms an adhesive bond between the surfaces.

To accelerate the rate of polymerisation various substances have been added to the curable composition. However, as explained in British Pat. Specification No. 1,295,902, the incorporation of accelerators has not always provided satisfactory results because, for reasons not fully understood, minute traces of certain metals, particularly iron, can provoke premature polymerisation so that the storage life of the anaerobic adhesive composition is severely shortened, or at best, unpredictable. These traces of metal may be impurities in the starting materials or may arise from contamination during manufacture of the anaerobic adhesive.

In the above-mentioned Specification it is proposed to overcome this difficulty by treating at least a portion of the anaerobically-polymerisable composition, or its precursor components, with an agent which forms an insoluble metal-containing precipitate with at least a portion of the metal contamination in the composition or its components to produce a material having a reduced content of metal contamination. The agent is preferably a chelating agent. As described, the treatment usually comprises stirring the material with a chelating agent, that agent being insoluble in the material to be treated, and then allowing the excess of chelating agent and the chelated material to separate out.

The process described in the above-mentioned Specification has, however, certain disadvantages. Because the chelating agent is usually insoluble in the polymerisable monomer (commonly, an ester of an acrylic acid), prolonged contact times are used: treatment times quoted in the Examples with chelating agents at room temperature or at 65°C are 1 hour, 4 days, 16 hours, 2 hours, 72 hours, 18 days, 4 hours, 24 hours, and 1 hour. Further, any excess of the chelating agent is separated from the treated monomer with the precipitated chelated material so that, if metal contamination should subsequently occur accidentally, there is no chelating agent available to prevent the metal contamination provoking undesirable premature polymerisation.

More recently, in French Pat. Specification 2,084,767 and British Pat. Specification 1,347,086, it is proposed to overcome the problem of metal contamination by dissolving in the anaerobic composition a soluble metal-chelating agent having ligand atoms other than a nitrogen atom which is part of a $>C=N-$ group. However, it is suggested to incorporate the chelating agent either as a solution in water or an alcohol-water mixture, which solvents could have a deleterious effect on the strength of the polymerised adhesive, or by adding ammonia or a primary amine, which substances could attack an ester of an acrylic acid by addition to ethylenic double bonds or by aminolysis of the ester groups.

We have found that these disadvantages can be at least substantially overcome by using as at least part of the polymerisable monomer certan novel esters which are acrylates containing alcoholic hydroxyl groups, these hydroxyl groups having been at least partially replaced by

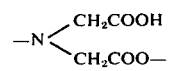

groups which are capable of chelating the metal contamination.

One aspect of this invention accordingly provides new esters of the general formula

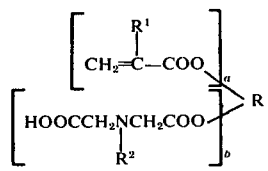

where
a is an integer of at least 1, and preferably from 2 to 4,
b is an integer of at least 1, but preferably not more than 2,
R denotes the residue, after removal of $(a + b)$ alcoholic hydroxyl groups, of an aliphatic, cycloaliphatic, araliphatic, or heterocycloaliphatic alcohol,
$R^1$ denotes $-H$, $-Cl$, $-CH_3$, or $-C_2H_5$, and
$R^2$ denotes a hydrogen atom or a monovalent aliphatic, cycloaliphatic, aromatic, araliphatic, heterocyclic, or heterocycloaliphatic group, such group preferably being substituted by a group of formula

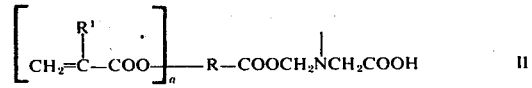

Compounds of formula I may also be of the formula

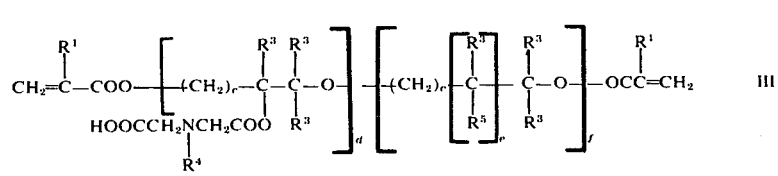

where each $R^1$ has the meaning previously assigned,
$R^3$ is —H, —$CH_3$, —$C_2H_5$, —$C_3H_7$, —$C_4H_9$, or

$R^4$ is the same as $R^2$ except that it is preferably substituted by a group of formula

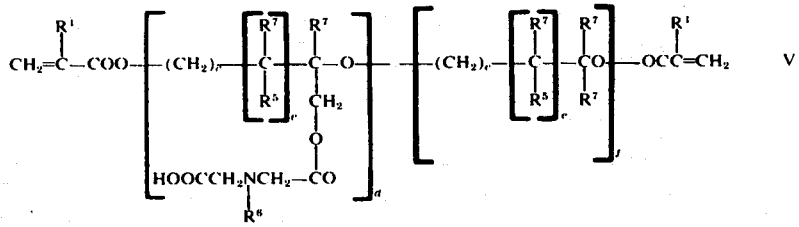

$R^5$ is —H, —OH, or —O—COC($R^1$)=$CH_2$,
$c$ is an integer of 1 to 8,
$d$ is an integer of 1 to 20,
$e$ is zero or 1, and
$f$ is zero or an integer of 1 to 19, such that ($d + f$) has a value of at most 20,
especially compounds of formula III where $c$ is 1 and ($d + f$) is an integer of from 2 to 5, or they may be of the formula

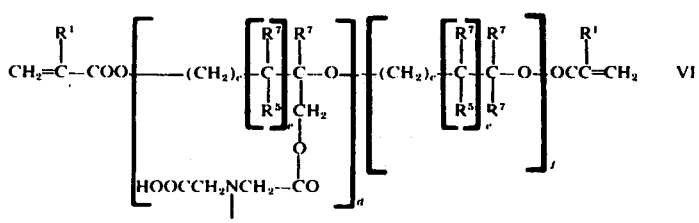

where
each $R^1$, $R^5$, $c$, $d$, $e$, and $f$ have the meanings previously assigned,
$R^6$ is the same as $R^2$ except that it is preferably substituted by a group of formula

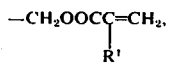

$R^7$ is —H, —$CH_3$, —$C_2H_5$, —$C_3H_7$, —$C_4H_9$, hydroxyalkyl of 1 to 4 carbon atoms, or

—$CH_2OOCC(R^1)=CH_2$, especially compounds of formula V where $c$ is 1 and ($d + f$) is an integer of from 2 to 5.

It should be understood that in formulae III, IV, V, and VI the groups within the $d$ and $f$ brackets may occur in any sequence.

Preferred compounds of formula III are those which are also of formula

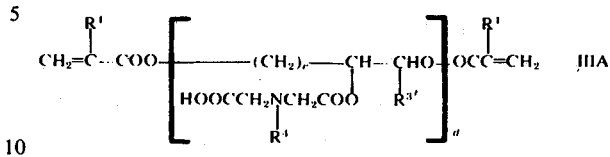

where
each $R^1$, $R^4$, $c$, and $d$ have the meanings previously assigned, and $R^{3'}$ is —H, —$CH_3$, —$C_2H_5$, or

Preferred compounds of formula V are those which are also of formula

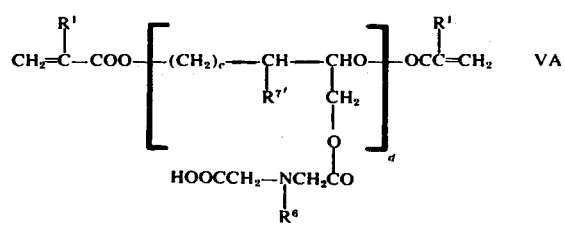

where each $R^1$, $R^6$, $c$, and $d$ have the meanings previously assigned, and $R^7$ is —H or

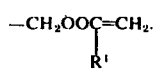

Compounds of formula I may further be of the general formula

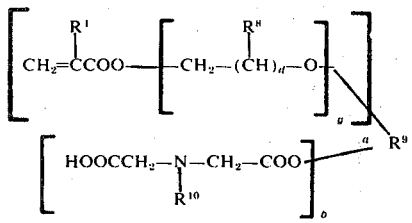

VII where
R¹, a, b, and d have the meanings previously assigned,
g is zero or an integer of from 1 to 20,
R⁸ is —H or —CH₃,
R⁹ denotes an organic radical of valency (a + b) linked through a carbon atom or carbon atoms thereof to the indicated oxygen atoms, and
R¹⁰ is the same as R² except that it is preferably substituted by a group of formula

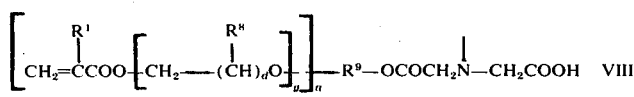 VIII

Preferred amongst such compounds of formula VII are those where d is 1, g is zero or 1, and R⁹ is the hydrocarbon residue of an aliphatic alcohol containing from 1 to 6 carbon atoms, such as a residue of formula —CH₂CH₂—
or

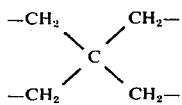

The particularly preferred compounds of formula I are also of the general formula

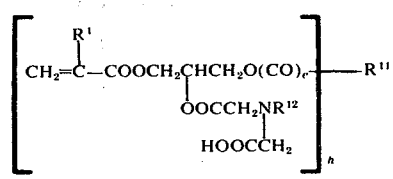 IX where
R¹ and e have the meanings previously assigned,
h is an integer of 1 to 4,
R¹¹ denotes an organic radical of valency h, linked through a carbon atom thereof, other than carbon atom of a carbonyl group, to the remainder of the molecule, and
R¹² is the same as R² except that it is preferably substituted by a group of formula

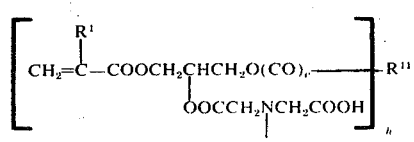 X

More particularly, when e is O, R¹¹ may denote the residue, containing from 1 to 18 carbon atoms, of an alcohol or phenol having h hydroxyl groups. R¹¹ may thus represent, for example, an aliphatic, aromatic, araliphatic, alkaromatic cycloaliphatic, optionally substituted by a heterocycle, or heterocycloaliphatic group, such as an aromatic group containing only one benzene ring, optionally substituted by chlorine or by alkyl groups each of from 1 to 9 carbon atoms, or an aromatic group comprising a chain of two to four benzene rings, optionally interrupted by ether oxygen atoms, aliphatic hydrocarbon groups of 1 to 4 carbon atoms, or sulphone groups, each benzene ring being optionally substituted by chlorine or by alkyl groups each of from 1 to 9 carbon atoms, and preferably is a saturated or unsaturated, straight or branched-chain aliphatic group, which may contain ether oxygen linkages and which may be substituted by hydroxyl groups, especially a saturated or monoethylenically-unsaturated straight chain aliphatic hydrocarbon group of from 1 to 8 carbon atoms.

Specific examples of such groups are the aromatic groups of the formulae —C₆H₅ and —C₆H₄CH₃, in which case h is 1, —C₆H₄C(CH₃)₂C₆H₄—, and —C₆H₄CH₂C₆H₄—, in which case h is 2, and —C₆H₄(CH₂C₆H₄)ⱼCH₂C₆H₄— where j is 1 or 2, in which case h is 3 or 4, and the aliphatic groups of formula

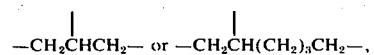

in which case h is 3, of formula —(CH₂)₄—, —CH₂CH=CHCH₂—, —CH₂CH₂OCH₂CH₂—, or —(CH₂CH₂O)₂CH₂CH₂—, in which case h is 2, or of the formula —(CH₂)₃CH₃, —(CH₂)₄OH, —CH₂CH=CH₂, or —CH₂CH=CHCH₂OH, in which case h is 1.

When e is 1, R₁₁ preferably represents the residue containing from 1 to 60 carbon atoms, of an acid having h carboxyl groups, especially a saturated or ethylenically-unsaturated, straight chain or branched aliphatic hydrocarbon group of from 1 to 20 carbon atoms, which may be substituted by chlorine atoms and which may be interrupted by ether oxygen atoms and-/or by carbonyloxy groups, or a saturated or ethylenically-unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms, which may be substituted by chlorine atoms.

Further preferred are such compounds in which R₁₁ represents
a saturated or ethylenically-unsaturated straight chain or branched aliphatic hydrocarbon group of from 1 to 8 carbon atoms, optionally substituted by a hydroxyl group, or
a saturated or ethylenically-unsaturated straight chain or branched aliphatic hydrocarbon group of from 4 to 50 carbon atoms and interrupted in the chain by carbonyloxy groups, or a saturated or ethylenically-unsaturated monocyclic or dicyclic cycloaliphatic hydrocarbon group of 6 to 8 carbon atoms, or an ethylenically-unsaturated cycloaliphatic-aliphatic hydrocarbon group of from 10 to 51 carbon atoms, or a mononuclear aromatic hydrocarbon group of from 6 to 8 carbon atoms.

Specific examples of these residues of carboxylic acids are those of the formula $-CH_3$, $-CH_2CH_3$, $-CH_2CH(OH)CH_3$, $-CH_2Cl$, and $-C_6H_5$, in which case $h$ is 1, and $-CH_2CH_2-$, $-CH=CH-$, and $-C_6H_4-$, in which case $h$ is 2.

Yet further esters of the general formula I include those which are also of the general formula

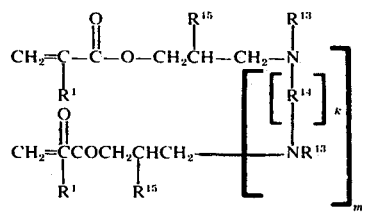  XI where
$R^1$ has the meaning previously assigned,
$k$ is zero or 1,
$m$ is zero or an integer of 1 to 4, with the proviso that when $k$ represents zero $m$ represents 1,
each $R^{13}$ denotes hydrogen, or an alkyl group of 1 to 6 carbon atoms which is optionally substituted by a cyano group, a hydroxyl group, or by a group of formula

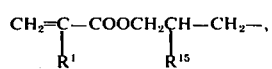

$R^{14}$ denotes a divalent aliphatic, aromatic, heterocyclic, or cycloaliphatic residue of 1 to 10 carbon atoms, linking through carbon atoms thereof two indicated nitrogen atoms,
$R^{15}$ is a hydroxyl group or a group of formula

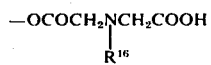  XII such that formula XI contains at least one group of formula XII, and
$R^{16}$ is the same as $R^2$ except that it is preferably substituted by a group of formula

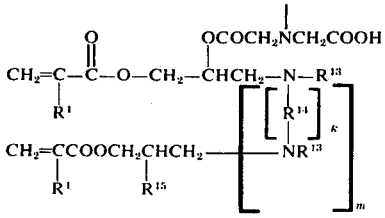  XIII or of formula

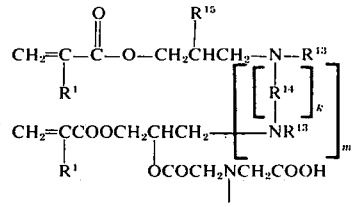  XIV $R^{13}$ may, for example, denote an isopropyl group, while $R^{14}$ may, for example, denote an ethylene, propylene, or p-phenylene group.

Preferred compounds of formula XI are those in which
$R^{13}$ denotes a hydrogen atom or an alkyl group of 1 to 6 carbon atoms, optionally substituted by a cyano group, a hydroxyl group, or by a group of formula

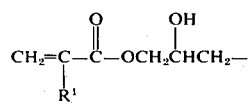

$R^{15}$ denotes a group of formula

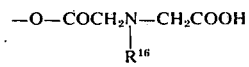

$k$ denotes 1, and
$m$ denotes an integer of 1 to 4.

Other preferred compounds of formula XI are those in which $k$ and $m$ are both zero, $R^{13}$ is an isopropyl group, and $R^1$ is a hydrogen atom or a methyl group.

In the formulae I, III, V, VII, IX, and XII, $R^2$, $R^4$, $R^6$, $R^{10}$, $R^{12}$, and $R^{16}$ preferably denote an aliphatic, cycloaliphatic, aromatic, araliphatic, heterocyclic, or heterocycloaliphatic group of 1 to 24 carbon atoms, particularly a mononuclear aryl group (especially a phenyl, chlorophenyl, methylphenyl, ethyphenyl, or nitrophenyl group), or an alkyl group (such as one of 1 to 18 carbon atoms), which may be substituted by a group of formula II, IV, VI, VIII, X, or XIII (or XIV) respectively, or, more especially, denote a. an alkylene radical, the chain of which may be interrupted by oxygen, sulphur, or nitrogen, in which any nitrogen atoms can be substituted by carboxyalkyl, carbocyclic, or heterocyclic groups, b. an arylene or cycloalkylene radical, or c. a radical of formula $-R^{17}R^{18}R^{17}-$, where
$R^{17}$ is an arylene radical, or a cycloalkylene radical which can be substituted by an alkoxy group, and
$R^{18}$ is oxygen, sulphur, sulphonyl, alkylene, or carbonyl, substituted by a group of formula II, IV, VI, VIII, X, or XIII (or XIV), respectively.

Further preferred are the compounds of formulae I, III, V, VII, IX, and XII in which $R^2$, $R^4$, $R^6$, $R^{10}$, $R^{12}$, and $R^{16}$ denote an alkylene radical of 2 to 6 carbon atoms interrupted by an ether oxygen atom (especially a 2-(ethoxy)ethyl group), a phenylene group, or a cyclohexylene group substituted by a group formula II,, IV, VI, VIII, X, or XIII (or XIV) respectively.

The esters of this invention are obtainable by esterification of an acid anhydride of the formula

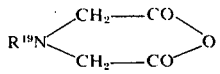

XV where R[19] denotes a hydrogen atom, or a monovalent aliphatic, cycloaliphatic, aromatic, araliphatic, heterocyclic, or heterocycloaliphatic group, with a hydroxyl-containing acrylate ester of formula

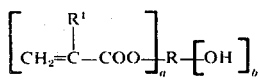

XVI using b g-mol. of the anhydride of formula XV per g-mol. of the acrylate of formula XVI. Hydroxy-containing acrylates of formula XVI are described in British Pat. Specifications Nos. 824677, 831056, 977361, 989201, 1006587, 1054614, 1146474, 1195485, 1222369, 1228479, 1235769, 1241851, 1262692, 1266159, and 1339017, Canadian Patent Specifications Nos. 804670 and 888274, U.S. Pat. Specification No. 3221043, and French Pat. Specification No. 1,531,224.

Preferably there is used a dianhydride, of formula

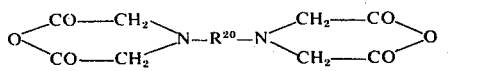

XVII where R[20] denotes
a. an alkylene radical, the chain of which may be interrupted by oxygen, sulphur, or nitrogen, in which the nitrogen atoms can be substituted by carboxyalkyl, carbocyclic, or heterocyclic groups,
b. an arylene or cycloalkylene radical, or
c. a radical of formula —R[17]R[18]R[17]-, where R[17] and R[18] are as previously defined,
and preferably denotes an alkylene radical of 1 to 6 carbon atoms, especially an ethylene group, an alkylene radical of 2 to 6 carbon atoms interrupted by an ether oxygen atom (especially a 2-(ethoxy)ethyl group), a phenylene group, or a cyclohexylene group, b/2 g-mol. of the dianhydride being used per g-mol. of the acrylate of formula XVI.

The particularly preferred anhydride is 1,2-bis(2,6-dioxomorpholin-4-yl)ethane i.e. the dianhydride of ethylenediaminetetra-acetic acid.

Compounds of formula XV are known (e.g. Bischoff and Hansdorfer, Chem. Ber., 1892, 25, 2272): the dianhydrides of formula XVII are described in British Pat. Specification No. 1,161,461.

The esters of this invention may also be obtained by esterifying the alcohol of general formula

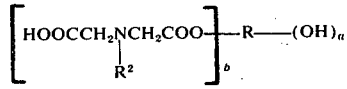

XVIII with a molecular proportions of the acrylic acid of the general formula

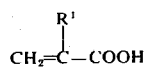

XIX where R, R[1], R[2], a, and b have the meanings previously assigned.

These esterifications can be carried out using conventional conditions.

While, according to British Pat. Specification No. 1,295,902, the anaerobically-polymerisable material which is treated with the chelating agent, such as ethylenediaminetetra-acetic acid and its homologues, may contain alcoholic hydroxyl groups, experiments conducted by the present inventors showed that esterification had substantially not taken place, the chelating agent being recovered virtually unchanged.

Another aspect of this invention provides anaerobically polymerisable compositions in which at least part of the polymerisable monomer comprises an ester of this invention together with a redoxactivatable latent initiator of free-radical polymerisation. The remainder, if any, of the polymerisable monomer is usually, but not necessarily, an ester of acrylic or methacrylic acid.

As already indicated, there is also provided a method of bonding two surfaces together which comprises placing between, and in contact with, the surfaces, an anaerobically polymerisable composition of this invention and allowing the composition to polymerise under anaerobic conditions. Typically, the surfaces are of metal (especially iron) or of glass or ceramic.

The redox-activatable latent initiator is preferably an organic hydroperoxide, such as those of formula $$R^{21}OOH \qquad XX$$

where R[21] is a monovalent organic radical containing up to 18 carbon atoms, especially an alkyl, aryl, or aralkyl radical containing from 4 to 13 carbon atoms. Typical hydroperoxides are ethyl methyl ketone hydroperoxide, tert.butyl hydroperoxide, cumene hydroperoxide, and hydroperoxides formed by the oxygenation of cetene or cyclohexene, tert.butyl hydroperoxide and cumene hydroperoxide being especially effective. Hydrogen peroxide may also be employed. A range of organic peroxides may be used, such as 2,5-dimethyl-2,5-di(tert.butylperoxy)hexane, di-tert.butyl peroxide, dihexylene glycol peroxide, tert.butyl cumyl peroxide isobutyl methyl ketone peroxide, and also peresters such as tert.butyl peracetate, tert.butyl perbenzoate, and tert.butyl perphthalate.

The compositions may also contain accelerators for the polymerisation, such as polyalkylenepolyamines, specific examples being diethylenetriamine and triethylenetetramine; polyisocyanates, such as toluene-2,4-diisocyanate; aldimines; tertiary amines, such as N-benzyldimethylamine and triethylamine; imides and sulphimides, such as o-benzoic sulphimide; dithiocarbamates; amides and thioamides such as formamide; thiazoles such as 2-mercaptobenzthiazole; ascorbic acid; organic phosphites; quaternary ammonium salts and bases; salts of transition metals; thioureas; and polymercaptans, especially esters of mercaptancarboxylic acids, such as glycerol tris(thioglycollate). Aliphatic or araliphatic tertiary amines are particularly preferred.

The amount of latent initiator may vary between 0.01% and 15% by weight of the polymerisable monomer; quantities of from 1% to 10% by weight are, however, preferred. The amount of accelerator used is preferably from 0.5 to 5% by weight of the polymerisable monomer.

The anaerobic adhesive may also contain various additives, such as inhibitors to prevent premature polymerisation, diluents, and thickeners. Typical inhibitors are quinones or hydroquinones: they may be employed in quantities of 0.001 to 0.1% by weight of the polymerisable monomer. It is generally desirable that the anaerobic adhesive is a liquid of low viscosity and it may be useful to add a diluent to lower the viscosity.

Anaerobic adhesives are, as already indicated, stable for prolonged periods in the presence of a sufficient quantity of oxygen but cure when oxygen is excluded. They are therefore best stored in containers which have an adequate air space therein and/or are permeable to air. The following Examples illustrate the invention: temperatures are in degrees Celsius and parts are by weight.

The hydroxyl-containing acrylates employed were made as described below. Epoxide contents were measured by titrating against a 0.1 N solution of perchloric acid in acetic acid in the presence of excess of tetraethylammonium bromide, crystal violet being used as the indicator.

Acrylate A

This is substantially 1,4-bis [2-hydroxy-3-(methacryloyloxy)-propoxy] butane, which was prepared by adding to a stirred mixture of methacrylic acid (66.2 g), triethylamine (1.5 g), and hydroquinone (0.2 g) heated at 120° in a glass vessel fitted with a reflux condenser, 100 g of butane-1,4-diol diglycidyl ether (epoxide content 7.7 equiv./kg) over 1½ hours and stirring the mixture at 120° for 30 minutes longer, by which time the epoxide content of the product (Acrylate A) was negligible.

Acrylate A1

This, too, is substantially 1,4-bis[ 2-hydroxy-3-(methacryloyloxy)-propoxy ] butane, prepared similarly to Acrylate A except that it was made in a stainless steel vessel.

Acrylate B

This is a commercial sample of triethylene glycol dimethacrylate.

Acrylate C

This is substantially bis [ 2-hydroxy-3-(methacryloyloxy)propyl ] cyclohexane-1,2-dicarboxylate, which was prepared by stirring a mixture of hexahydrophthalic acid (30 g), glycidyl methacrylate (50 g), triethylamine (1 g), and hydroquinone (0.1 g) at 120° for 2½ hours, by which time its epoxide content was negligible.

EXAMPLE 1

To Acrylate A (168 g) was added 1,2-bis(2,6-dioxomorpholin-4-yl)ethane (3 g) and the mixture was stirred at 120° for 1 hour, by which time infrared spectroscopy showed the absence of anhydride groups. The product, "Product I", was a clear homogeneous, brown liquid and is considered to contain the acid of formula

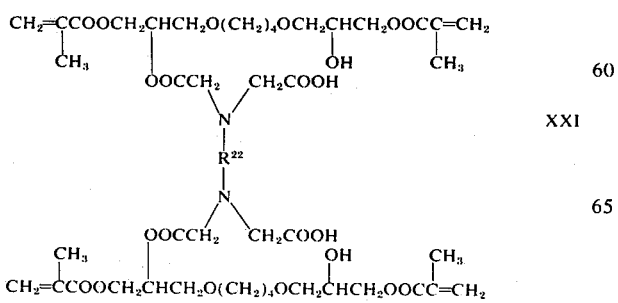

XXI where $R^{22}$ denotes —$CH_2CH_2$—.

To Acrylate A1 (50 g) was added 1,2-bis(2,6-dioxomorpholin-4-yl)-ethane (1 g) and the mixture was stirred at 120° for 1 hour, by which time infrared spectroscopy showed no absorption due to anhydride groups in the product, a clear, homogeneous, brown liquid ("Product II").

The preparation of Product II was repeated except that the reactants, instead of being heated, were stirred together for 20 hours at 20°; the product is termed "Product III".

Products II and III are likewise considered to contain the acid of formula XXI, where $R^{22}$ denotes —$CH_2CH_2$—.

A mixture of 2-hydroxyethyl methacrylate (26 g, 0.2 g-mol.), 1,2-bis(2,6-dioxomorpholin-4-yl)ethane (25 g, 0.1 g-mol.), hydroquinone (0.05 g), triethylamine (0.5 g), and toluene (100 ml) was heated under reflux for 1 hour. The mixture was then stirred at room temperature for 3 days, and the solvent was removed under reduced pressure to leave Product IV. Infrared spectroscopy showed the absence of anhydride groups.

Product IV consists essentially of the acid of formula

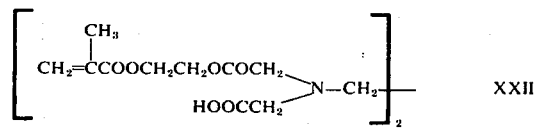

XXII

Product V is similar to Product I but was made from methacrylic acid in a one-stage process, viz.

To a stirred mixture of methacrylic acid (63.6 g), triethylamine (1.5 g), hydroquinone (0.2 g), and 1,2-bis(2,6-dioxomorpholin-4-yl)ethane (3 g) at 120° was added 100 g of butane-1,4-diol diglycidyl ether (epoxide content 7.4 equiv./kg) over 2 hours. The mixture was stirred for a further 30 minutes at 120° by which time the epoxide content of the product was negligible and infrared spectroscopy showed no absorption due to anyhydride groups. Product V was a completely homogeneous, clear brown liquid with no undissolved particles.

Products VI, VII, and VIII were made by stirring together, respectively, 50 g of Acrylate A1 and 1 g of 1,2-bis(2,6-dioxomorpholin-4-yl)cyclohexane, 50 g of Acrylate A1 and 1 g of ethylene glycol bis [2-(2,6-dioxomorpholin-4-yl)ethyl] ether, and 25 g of Acrylate C and 0.5 g of 1,2-bis(2,6-dioxomorpholin-4-yl)ethane, for 1 hour at 120°, by which time anhydride groups could no longer be detected by infrared spectroscopy.

Product VI is considered to contain the acid of formula XXI, where $R^{22}$ denotes

XXIII

Product VII is considered to contain the acid of formula XXI, where $R^{22}$ denotes $-CH_2CH_2OCH_2CH_2OCH_2CH_2-$  XXIV Product VIII is considered to contain the acid of formula

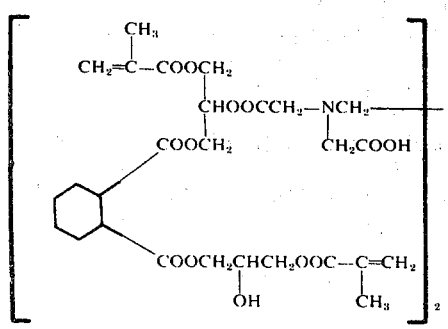
XXV

A mixture of Acrylate Al (10 g) and 4-phenyl-2,6-dioxomorpholine (0.3 g, prepared in an analogous manner to that described in British Pat. Specification No. 1161461) was stirred at 120° for 1 hour, by which time infrared spectroscopy of the clear, homogeneous product showed no absorption due to anhydride groups.

The product ("Product IX") is considered to contain the acid of formula

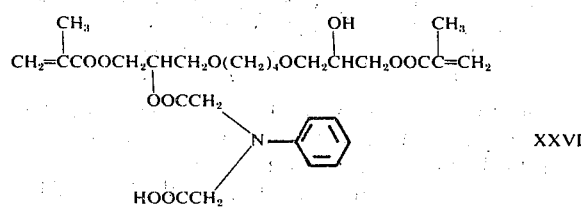
XXVI

EXAMPLE 2

A conventional anaerobic curing composition was prepared by mixing Acrylate A (100 parts), cumene hydroperoxide (5 parts), and N-benzyldimethylamine (2 parts) at room temperature until a homogeneous mixture was obtained. A sample of this composition, as a layer 2 cm deep in an open glass test tube 2 cm wide and 12 cm long, was heated in a waterbath kept at 80° and the time taken for it to gel was observed.

Persistence of the composition in liquid form at 80° for 20 minutes is considered by those skilled in the anaerobic adhesive art to indicate that the shelf life at normal temperatures (about 15 to 25°) would be about one year. The sample gelled after 12 minutes.

A similar anaerobic curing composition was prepared, Acrylate A being replaced by the same weight of Product I, and a sample thereof was subjected to the heat-ageing test just described. The sale took 38 minutes to gel at 80°, indicating a significant improvement in shelf stability over the composition containing Acrylate A.

Bond strengths formed by the anaerobic compositions just described were measured by applying the compositions between the threads of nuts and bolts (11 mm diameter), both of mild steel, leaving the assemblies to cure at room temperature, and determining the torque required to turn the nuts through ¼, ½, ¾, and 1 turn; the average of the four valves is called the "prevailing torque".

The prevailing torque obtained from the composition containing Acrylate A was 15 Nm, measured after 18 hours; that obtained from the composition containing Product I was 23 Nm, measured after 19½ hours. Thus the treatment of Acrylate A with 1,2-bis(2,6-dioxomorpholin-4-yl)-ethane had no detrimental effect upon its anaerobic cure.

EXAMPLE 3

A conventional anaerobic composition, prepared by mixing Acrylate Al (100 parts), cumene hydroperoxide (5 parts), and N-benzyldimethylamine (2 parts), was subjected to the heat-ageing test described above. A sample gelled in less than 1 minute at 80°, indicating that the shelf life of the composition was quite inadequate.

Two similar compositions were made, the Acrylate Al being replaced by the same weight of, respectively, Product II and Product III. Their gel-times at 80° were 35 and 36 minutes.

EXAMPLE 4

A mixture of Acrylate A (50 g) and Product IV (2.5 g) was stirred at 60° for 1 hour, forming a clear homogeneous liquid. An anaerobic composition, which was prepared by adding this liquid (100 parts) to cumene hydroperoxide (5 parts) and N-benzyldimethylamine (2 parts), remained liquid for 49 minutes at 80°, thus indicating a significant improvement in shelf life over a similar composition prepared with Acrylate A which, as shown in Example 2, gelled after only 12 minutes at 80°.

EXAMPLE 5

A conventional anaerobic composition prepared by mixing Acrylate B (100 parts) with cumene hydroperoxide (5 parts) and N-benzyldimethylamine (2 parts) gelled after 10 minutes when subjected to the heat-ageing test at 80°.

A mixture of Acrylate B (50 g) and Product IV (2.5 g) was stirred at 60° for 1½ hours and then at room temperature (20°) for 16 hours. A similar anaerobic composition, containing this treated material (100 parts) in place of the Acrylate B, gelled after 20 minutes at 80° in the heat-ageing test, indicating a significant improvement in shelf life over that of the composition containing Acrylate B.

EXAMPLE 6

An anaerobic composition, prepared by mixing Product V (100 parts) with cumene hydroperoxide (5 parts) and N-benzyldimethylamine (2 parts), was subjected to the heat-ageing test. The sample gelled after 20 minutes at 80°.

EXAMPLE 7

An anaerobic composition was prepared from Product VI (100 parts), cumene hydroperoxide (5 parts), and N-benzyldimethylamine (2 parts). A sample, subjected to the heat-ageing test, remained liquid for 10 minutes at 80°, a significant improvement over the composition prepared from Acrylate Al, which gelled in less than 1 minute at 80° (see Example 3).

EXAMPLE 8

An anaerobic composition was prepared by mixing Product VII (100 parts) with cumene hydroperoxide (5 parts) and N-benzyldimethylamine (2 parts). A sample of this composition remained liquid for 16 minutes at 80° in the heat-ageing test; a similar anaerobic composition prepared from Acrylate A1 gelled in less than 1 minute at 80° (see Example 3).

EXAMPLE 9

A sample of a conventional anaerobic composition comprising Acrylate C (100 parts), cumene hydroperoxide (2 parts), and N-benzyldimethylamine (2 parts) was heat-aged at 80°. The sample gelled in 14 minutes.

A sample of a similar composition, in which the Acrylate C was replaced by the same weight of Product VIII, when subjected to the same heat-ageing test, remained liquid for 23 minutes.

EXAMPLE 10

An anaerobic composition was prepared from Product IX (100 parts), cumene hydroperoxide (5 parts) and N-benzyldimethylamine (2 parts). A sample of this composition remained liquid for 8 minutes at 80° in the heat-ageing tests, thus showing a significant improvement over a similar composition containing Acrylate A1, which gelled within 1 minute at 80° (see Example 3).

EXAMPLE 11

Product X was made by stirring together 25 g of Acrylate A1 and 0.5 g of 4-methyl-2,6-dioxomorpholine for 1 hour at 120°, by which time anhydride groups could no longer be detected by infrared spectroscopy.

Product X is considered to be substantially of the formula

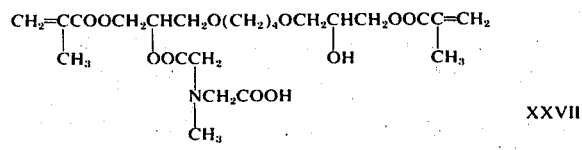

XXVII

EXAMPLE 12

An anaerobic composition was prepared from Product X (100 parts), cumene hydroperoxide (5 parts), and N-benzyldimethylamine (2 parts). A sample of this composition remained liquid for 18 minutes at 80° in the heat-ageing test, thus showing a significant improvement over a similar composition containing, in place of Product X, Acrylate A1; that composition gelled within 1 minute at 80° (see Example 3).

We claim:
1. Anaerobically-polymerisable compositions comprising a polymerisable monomer and a redox-activatable initiator of free-radical polymerisation, in which the said monomer is an ester of the general formula

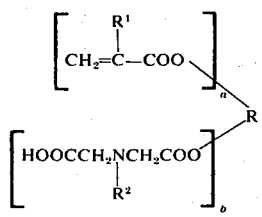

where
$a$ is an integer of 1 to 4, and $b$ is an integer of 1 or 2,
R denotes the residue, after removal of $(a + b)$ alcoholic hydroxyl groups, of an aliphatic, cycloaliphatic, araliphatic, or heterocycloaliphatic alcohol,
$R^1$ denotes —H, —Cl, —$CH_3$, or —$C_2H_5$, and
$R^2$ denotes a hydrogen atom or an aliphatic, cycloaliphatic, aromatic, araliphatic, heterocyclic, or heterocycloaliphatic group of 1 to 24 carbon atoms.

2. Compositions according to claim 1, in which $R^2$ denotes a mononuclear aryl group or an alkyl group.

3. Compositions according to claim 1, in which $R^2$ is such a group, substituted on a carbon atom thereof by a group of formula

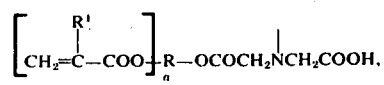

where R, $R^1$, and have the meanings assigned in claim 1.

4. Compositions according to claim 1, in which $R^2$ denotes
  a. an alkylene hydrocarbon radical, or an alkylene radical the chain of which is interrupted by at least one oxygen atom, by at least one sulfur atom, or by at least one nitrogen atom which bears a carboxyalkyl, carbocyclic, or heterocyclic group,
  b. an arylene or cycloalkylene radical, or
  c. a radical of formula —$R^{17}R^{18}R^{17}$, where
    $R^{17}$ is an arylene radical, a cycloalkylene hydrocarbon radical, or a cycloalkylene radical which is substituted by an alkoxy group, and
    $R^{18}$ is an oxygen or sulfur atom, or an alkylene, sulfonyl, or carbonyl group,
wherein the radicals represented by (a), (b), and (c) are substituted to the nitrogen atom of a group of the formula

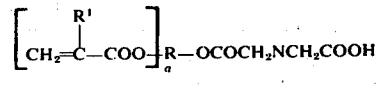

where R, $R^1$, and $a$ have the meanings assigned in claim 1.

5. Compositions according to claim 1, in which the said ester is also of the general formula

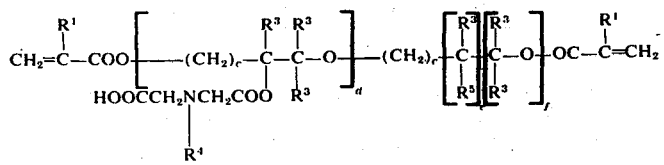

where
each $R^1$ has the meaning assigned in claim 1,
$R^3$ denotes —H, —$CH_3$, —$C_2H_5$, —$C_3H_7$, —$C_4H_9$, or

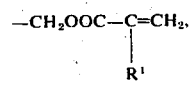

each $R^4$ denotes a hydrogen atom or an aliphatic, cycloaliphatic, aromatic, araliphatic, heterocyclic, or heterocycloaliphatic group of 1 to 24 carbon atoms, $R^5$ is —H, —OH, or —O—CO—C($R^1$)=$CH_2$, c is an integer of 1 to 8, d is an integer of 1 to 20, e is zero or 1, and f is zero or an integer of 1 to 19, such that (d + f) has a value of at most 20.

6. Compositions according to claim 5, in which $R^4$ denotes a mononuclear aryl group or an alkyl group.

7. Compositions according to claim 5, in which $R^4$ denotes such a group, substituted on a carbon atom thereof by a group of formula

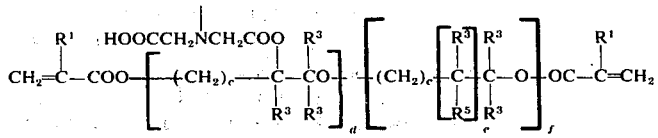

where
each $R^1$ has the meaning assigned in claim 1, and
$R^3$, $R^5$, c, d, e, and f have the meanings assigned in claim 5.

8. Compositions according to claim 5, in which $R^5$ denotes
   a. an alkylene hydrocarbon radical, or an alkylene radical the chain of which is interrupted by at least one oxygen atom, by at least one sulfur atom, or by at least one nitrogen atom which bears a carboxyalkyl, carbocyclic, or heterocyclic group,
   b. an arylene or cycloalkylene radical, or
   c. a radical of formula —$R^{17}R^{18}R^{17}$, where
      $R^{17}$ is an arylene radical, a cycloalkylene hydrocarbon radical, or a cycloalkylene radical which is substituted by an alkoxy group, and $R^{18}$ is an oxygen or sulfur atom, or an alkylene, sulfonyl, or carbonyl group, wherein the radicals represented by (a), (b), and (c) are substituted to the nitrogen atom of a group of the formula

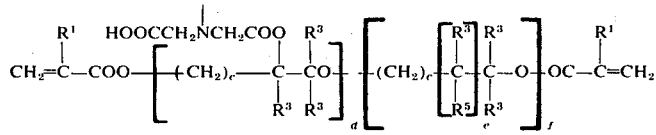

where
each $R^1$ has the meaning assigned in claim 1, and $R^3$, $R^5$, c, d, e, and f have the meanings assigned in claim 5.

9. Compositions according to claim 1, in which the said ester is also of the general formula

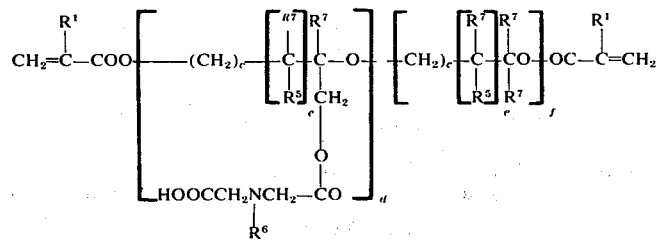

where
each $R^1$ has the meaning assigned in claim 1,
$R^5$, c, d, e, and f have the meanings assigned in claim 5, and
each $R^6$ denotes a hydrogen atom or an aliphatic, cycloaliphatic, aromatic, araliphatic, heterocyclic, or heterocycloaliphatic group of 1 to 24 carbon atoms.

10. Compositions according to claim 9, in which $R^6$ denotes a mononuclear aryl group or an alkyl group.

11. Compositions according to claim 9, in which $R^6$ is such a group, substituted on a carbon atom thereof by a group of formula

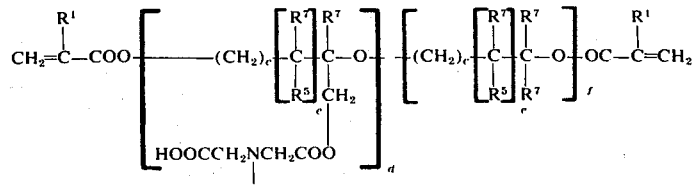

where
each $R^1$ has the meaning assigned in claim 1,
$R^5$, c, d, e, and f have the meanings assigned in claim 5, and
$R^7$ is —H, —$CH_3$, —$C_2H_5$, —$C_3H_7$, —$C_4H_9$, hydroxyalkyl of 1 to 4 carbon atoms, or

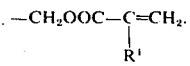

12. Compositions according to claim 9, in which $R^6$ denotes a. an alkylene hydrocarbon radical, or an alkylene radical the chain of which is interrupted by at least one oxygen atom, by at least one sulfur atom, or by at least one nitrogen atom which bears a carboxyalkyl, carbocyclic, or heterocyclic group,
b. an arylene or cycloalkylene radical, or
c. a radical of formula $—R^{17}R^{18}R^{17}$, where
$R^{17}$ is an arylene radical, a cycloalkylene hydrocarbon radical, or a cyloalkylene radical which is substituted by an alkoxy group, and
$R^{18}$ is an oxygen or sulfur atom, or an alkylene, sulfonyl, or carbonyl group,
wherein the radicals represented by (a), (b), and (c) are substituted to the nitrogen atom of a group of the formula

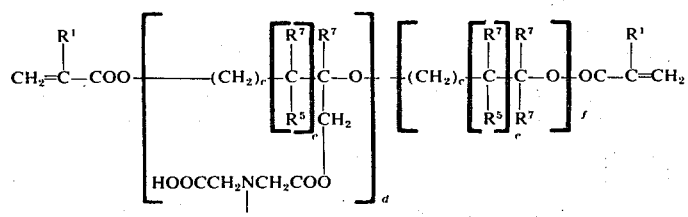

where
each $R^1$ has the meaning assigned in claim 1,
$R^5$, c, d, e, and f have the meanings assigned in claim 5, and
$R^7$ is $—H$, $—CH_3$, $—C_2H_5$, $—C_3H_7$, $—C_4H_9$, hydroxyalkyl of 1 to 4 carbon atoms, or

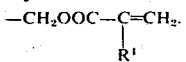

13. Compositions according to claim 1, in which the said ester is also of the general formula

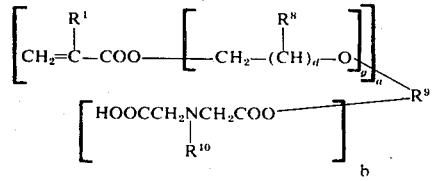

where
each $R^1$, a, and b have the meanings assigned in claim 1,
d has the meaning assigned in claim 5,
g is zero or an integer of from 1 to 20,
$R^8$ is $—H$ or $—CH_3$,
$R^9$ denotes an organic radical of valency $(a + b)$ linked through a carbon atom or carbon atoms thereof to the indicated oxygen atoms, and
each $R^{10}$ denotes a hydrogen atom or an aliphatic, cycloaliphatic, aromatic, aralkyl, heterocyclic, or heterocycloaliphatic group of 1 to 24 carbon atoms.

14. Compositions according to claim 13, in which $R^{10}$ denotes a mononuclear aryl group or an alkyl group.

15. Compositions according to claim 13, in which $R^{10}$ denotes such a group, substituted on a carbon atom thereof by a group of formula

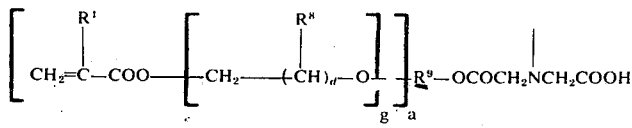

where
each $R^1$ and a have the meanings assigned in claim 1,
d has the meaning assigned in claim 5, and
g, $R^8$, and $R^9$ have the meanings assigned in claim 13.

16. Compositions according to claim 13, in which $R^{10}$ denotes
a. an alkylene hydrocarbon radical, or an alkylene radical the chain of which is interrupted by at least one oxygen atom, by at least one sulfur atom, or by at least one nitrogen atom which bears a carboxyalkyl, carbocyclic, or heterocyclic group,
b. an arylene or cycloalkylene radical, or
c. a radical of formula $-R^{17}R^{18}R^{17}$, where
$R^{17}$ is an arylene radical, a cycloalkylene hydrocarbon radical, or a cycloalkylene radical which is substituted by an alkoxy group, and
$R^{18}$ is an oxygen or sulfur atom, or an alkylene, sulfonyl, or carbonyl group, wherein the radicals represented by (a), (b), and (c) are substituted to the nitrogen atom of a group of the formula

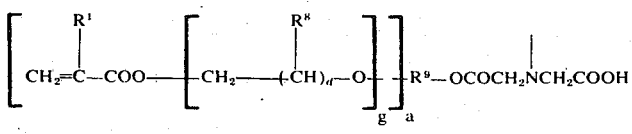

where
each $R^1$ and a have the meanings assigned in claim 1,
d has the meaning assigned in claim 5, and
g, $R^8$, and $R^9$ have the meanings assigned in claim 13.

17. Compositions according to claim 1, in which the said ester is also of the general formula

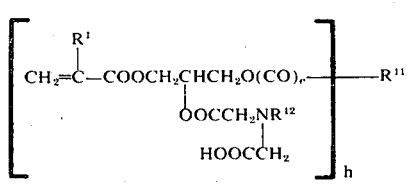

where each $R^1$ has the meaning assigned in claim 1,
$e$ has the meaning assigned in claim 5,
$h$ is an integer of 1 to 4,
$R^{11}$ denotes an organic radical of valency h, linked through a carbon atom thereof, other than the carbon atom of a carbonyl group, to the remainder of the molecule, and
$R^{12}$ denotes a hydrogen atom or an aliphatic, cycloaliphatic, aromatic, araliphatic, heterocyclic, or heterocycloaliphatic group of 1 to 24 carbon atoms.

18. Compositions according to claim 17, in which $R^{12}$ denotes a mononuclear aryl group or an alkyl group.

19. Compositions according to claim 17, in which $R^{12}$ denotes such a group, substituted on a carbon atom thereof by a group of formula

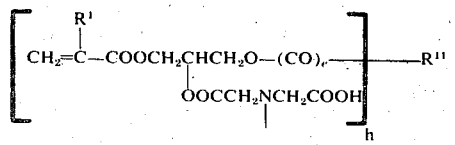

where
each $R^1$ has the meaning assigned in claim 1,
$e$ has the meaning assigned in claim 5, and
$R^{11}$ and h have the meanings assigned in claim 17.

20. Compositions according to claim 17, in which $R^{12}$ denotes
   a. an alkylene hydrocarbon radical, or an alkylene radical the chain of which is interrupted by at least one oxygen atom, by at least one sulfur atom, or by at least one nitrogen atom which bears a carboxyalkyl, carbocyclic, or heterocyclic group,
   b. an arylene or cycloalkylene radical, or
   c. a radical of formula $-R^{17}R^{18}R^{17}$, where
   $R^{17}$ is an arylene radical, a cycloalkylene hydrocarbon radical, or a cycloalkylene radical which is substituted by an alkoxy group, and
   $R^{18}$ is an oxygen or sulfur atom, or an alkylene, sulfonyl, or carbonyl group,
wherein the radicals represented by (a), (b), and (c) are substituted to the nitrogen atom of a group of the formula

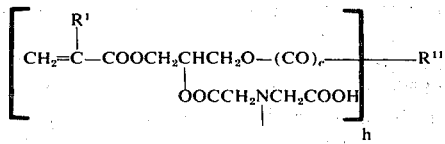

where
each $R^1$ has the meaning assigned in claim 1,
$e$ has the meaning assigned in claim 5, and
$R^{11}$ and h have the meanings assigned in claim 17.

21. Compositions according to claim 1, in which the said ester is also of the general formula

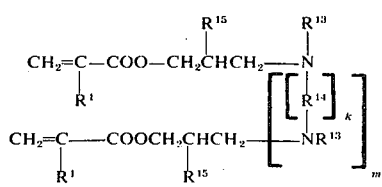

where
each $R^1$ has the meaning assigned in claim 1,
$k$ is zero or 1,
$m$ is zero or an integer of 1 to 4, with the proviso that when $k$ represents zero m represents 1,
each $R^{13}$ denotes a hydrogen atom, an alkyl hydrocarbon group of 1 to 6 carbon atoms, an alkyl group of 1 to 6 carbon atoms which is substituted by a cyano group, an alkyl group of 1 to 6 carbon atoms which is substituted by a hydroxyl group, or an alkyl group of 1 to 6 carbon atoms which is substituted by a group of formula

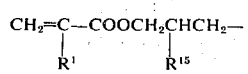

$R^{14}$ denotes a divalent aliphatic, aromatic, heterocyclic, or cycloaliphatic residue of 1 to 10 carbon atoms, linking through carbon atoms thereof two indicated nitrogen atoms,
each $R^{15}$ is a hydroxyl group or a group of formula

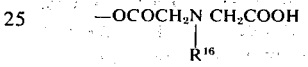

such that the said ester contains at least one group of formula

and
$R^{16}$ denotes a hydrogen atom or an aliphatic, cycloaliphatic, aromatic, araliphatic, heterocyclic, or heterocycloaliphatic group of 1 to 24 carbon atoms.

22. Compositions according to claim 21, in which $R^{16}$ denotes a mononuclear aryl group or an alkyl group.

23. Compositions according to claim 21, in which $R^{16}$ denotes such a group, substituted on a carbon atom thereof by a group of formula

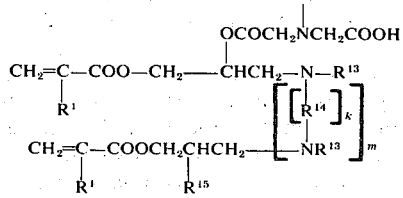

where
each $R^1$ has the meaning assigned in claim 1, and
each $R^{13}$, $R^{14}$, $R^{15}$, $k$, and $m$ have the meanings assigned in claim 21.

24. Compositions according to claim 21, in which $R^{16}$ denotes
   a. an alkylene hydrocarbon radical, or an alkylene radical the chain of which is interrupted by at least one oxygen atom, by at least one sulfur atom, or by at least one nitrogen atom which bears a carboxyalkyl, carbocyclic, or heterocyclic group,
   b. an arylene or cycloalkylene radical, or
   c. a radical of formula $-R^{17}R^{18}R^{17}$, where $R^{17}$ is an arylene radical, a cycloalkylene hydrocarbon radical, or a cycloalkylene radical which is substituted by an alkoxy group, and $R^{18}$ is an oxygen or sulfur atom, or an alkylene, sulfonyl, or carbonyl group, wherein the radicals represented by (a), (b), and (c) are substituted to the nitrogen atom of a group of the formula

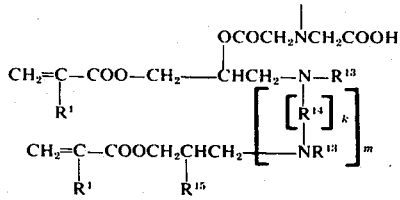

where each $R^1$ has the meaning assigned in claim 1, and each $R^{13}$, $R^{14}$, $R^{15}$, $k$, and $m$ have the meanings assigned in claim 21.

25. Anaerobically-polymerisable compositions comprising a polymerisable monomer and a redox-activatable latent initiator of free-radical polymerisation, in which the said monomer comprises an ester made by the esterification of an hydroxyl-containing acrylate ester of formula

with $b$ g-mol. of an anhydride of formula

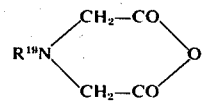

per g-mol. of the said acrylate ester, where

R, $R^1$, $a$, and $b$ have the meanings assigned in claim 1, and $R^{19}$ denotes a hydrogen atom or an aliphatic, cycloaliphatic, aromatic, araliphatic, heterocyclic, or heterocycloaliphatic group of 1 to 24 carbon atoms.

26. Anaerobically-polymerisable compositions comprising a polymerisable monomer and a redox-activatable latent initiator of free-radical polymerisation, in which the said monomer comprises an ester made by the esterification of an hydroxyl-containing acrylate ester of formula

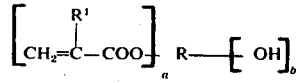

with $b/2$ g-mol. of a dianhydride of formula

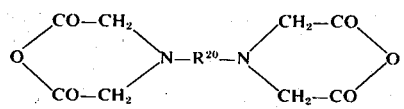

per g-mol. of the said acrylate ester, where

R, $R^1$, $a$, and $b$ have the meanings assigned in claim 1, and $R^{20}$ denotes a. an alkylene hydrocarbon radical, or an alkylene hydrocarbon radical the chain of which is interrupted by at least one oxygen atom, by at least one sulfur atom, or by at one nitrogen atom which bears a carboxyalkyl, carbocyclic, or heterocyclic group, b. an arylene or cycloalkylene radical, or c. a radical of formula —$R^{17}R^{18}R^{17}$, where $R^{17}$ and $R^{18}$ are as defined in claim 4.

27. Anaerobically-polymerizable compositions comprising a polymerizable monomer and a redox-activatable latent initiator of free-radical polymerization, in which the said monomer comprises an ester made by the esterification of an alcohol of the general formula

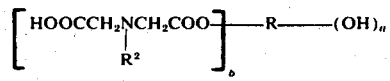

with a molecular proportions of an acrylic acid of the general formula

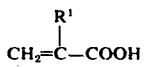

where

R, $R^1$, $R^2$, $a$, and $b$ have the meanings assigned in claim 1.

28. Compositions according to claim 1, in which the initiator is an organic peroxide or organic hydroperoxide.

29. Compositions as claimed in claim 1, containing from 0.01% to 15% by weight of the initiator, calculated on the total weight of polymerizable monomer.

30. Compositions as claimed in claim 1, which also contain an accelerator for the anaerobic polymerization.

31. Compositions according to claim 30, containing from 0.5 to 5% by weight of the accelerator, calculated on the total weight of polymerizable monomer.

* * * * *